(12) United States Patent  
Inoue et al.

(10) Patent No.: US 8,537,515 B2  
(45) Date of Patent: Sep. 17, 2013

(54) DRIVING CIRCUIT AND SEMICONDUCTOR DEVICE WITH THE DRIVING CIRCUIT

(75) Inventors: Takahiro Inoue, Tokyo (JP); Shoichi Orita, Tokyo (JP); Koji Tamaki, Fukuoka (JP)

(73) Assignee: Mitsubishi Electric Corporation, Tokyo (JP)

( * ) Notice: Subject to any disclaimer, the term of this patent is extended or adjusted under 35 U.S.C. 154(b) by 258 days.

(21) Appl. No.: 13/184,737

(22) Filed: Jul. 18, 2011

(65) Prior Publication Data

US 2012/0099234 A1    Apr. 26, 2012

(30) Foreign Application Priority Data

Oct. 20, 2010  (JP) .................................. 2010-235107

(51) Int. Cl.
*H02H 3/20*    (2006.01)
*H02H 3/24*    (2006.01)
*H02H 9/04*    (2006.01)

(52) U.S. Cl.
USPC .......................................... 361/90; 361/91.1

(58) Field of Classification Search
USPC .................................... 361/90, 91.1
See application file for complete search history.

(56) References Cited

U.S. PATENT DOCUMENTS

| | | | | |
|---|---|---|---|---|
| 5,375,029 A * | 12/1994 | Fukunaga et al. | ............ | 361/101 |
| 6,594,129 B1 * | 7/2003 | Baba et al. | ...................... | 361/87 |
| 7,091,633 B2 * | 8/2006 | Castagnet et al. | ............ | 307/131 |
| 7,315,439 B2 * | 1/2008 | Muenzer et al. | .............. | 361/91.1 |
| 7,817,392 B2 * | 10/2010 | Lee et al. | ........................ | 361/89 |

FOREIGN PATENT DOCUMENTS

| | | |
|---|---|---|
| DE | 43 34 386 A1 | 4/1994 |
| JP | 5-48592 | 6/1993 |
| JP | 6-86564 | 3/1994 |
| JP | 2008-306791 | 12/2008 |

OTHER PUBLICATIONS

German Office Action issued Sep. 25, 2012, in Patent Application No. 10 2011 081 970.3 (with English-language translation).
Tietze, "Semiconductor circuit design", Springer Publishing House, 11$^{th}$ Edition, 1999, pp. 968, 969, 973, 974.
Data Sheet EXB840, Fuji Electric Co., Ltd., Sep. 1995, (195t/R89) Sh150, 2 pages.

* cited by examiner

*Primary Examiner* — Dharti Patel
(74) *Attorney, Agent, or Firm* — Oblon, Spivak, McClelland, Maier & Neustadt, L.L.P.

(57) ABSTRACT

A driving circuit is placed on an IC chip, and which drives a semiconductor switching element. The driving circuit includes: a power supply circuit for receiving a first voltage supplied from a single power supply provided outside the IC chip, generating a second voltage based on the first voltage, and applying the second voltage to a reference terminal of the semiconductor switching element; and a driving part for driving the semiconductor switching element by applying the first voltage or stopping application of the first voltage to a control terminal of the semiconductor switching element in response to an input signal given from outside the IC chip.

9 Claims, 8 Drawing Sheets

DRIVING CIRCUIT AND SEMICONDUCTOR DEVICE WITH THE DRIVING CIRCUIT

BACKGROUND OF THE INVENTION

1. Field of the Invention

The present invention relates to a driving circuit and a semiconductor device with the driving circuit. The present invention more specifically relates to a technique of applying a negative bias to a power semiconductor switching element.

2. Description of the Background Art

A power semiconductor module, more specifically what is called an IPM (intelligent power module) is used for power control or motor control of industrial machines, electric railroads, automobiles, office automation, household electric appliances, and others. This power semiconductor module includes a plurality of semiconductor switching elements such as IGBTs, and a control circuit for driving and controlling the semiconductor switching elements that are housed in one package.

An enhancement element with a positive threshold is generally used as a power semiconductor switching element (IGBT or MOSFET). So, in principle, application of a negative bias to a control terminal is not required to turn the switching element off. The switching element can be turned off only by making a gate voltage not exceed a threshold (that is generally 0 V).

Meanwhile, this bias of 0 V may cause a problem during a transient phenomenon (dynamic operation). To be specific, a voltage across main terminals (collector-to-emitter voltage) increases rapidly in response to a switching operation for turn-off. At this time, electric charges are accumulated in a gate through a feedback capacitor placed between the collector and the gate to increase a gate voltage. So, the switching element in off state may accidentally be turned on.

A threshold has a negative temperature coefficient. So, a threshold decreases during a high-temperature operation, thereby making the aforementioned problem more serious.

In order to avoid this problem, a negative bias may be applied between the gate and the emitter when the switching element is turned off, thereby preventing the gate voltage from exceeding the threshold.

Meanwhile, a negative power supply is required for application of a negative bias, meaning that a driving circuit requires two power supplies including a positive power supply for applying a positive bias for turn-on and the negative power supply. This disadvantageously results in upsizing of an entire system.

The aforementioned problem may be solved by the following technique that does not require application of a negative bias. According to this technique, a control IC for supplying a gate voltage and a bare chip IGBT are arranged close to each other in an IPM. An interconnect line is placed such that the control IC and the IGBT are separated by the shortest distance, thereby reducing interconnect impedance to the lowest possible level. Thus, a short-circuit can be formed between the gate and the emitter of the IGBT at low impedance. As a result, a gate voltage is not increased even if an applied bias is 0V. Further, a single power supply can be used in a driving circuit, thereby allowing size reduction of an entire system.

Meanwhile, as a result of recent advances in semiconductor technology, semiconductor switching elements have been developed and put into practical use that operate at high speeds, and in an environment of higher temperature and higher voltage than those of a conventionally employed environment. A semiconductor switching element should be operated reliably in such an environment. The aforementioned technique of close arrangement to reduce impedance finds difficulty in maintaining a reliable operation (especially, turn-off) in a high-temperature and high-voltage environment.

This may be avoided by a conventionally employed technique that causes a control circuit to generate a negative voltage from a single power supply, and realizes driving with a negative bias by using the negative voltage thereby generated. As disclosed for example in patent literature 1 (Japanese Utility Model Application Laid-Open No. 5-48592 (1993)) or in non-patent literature 1 (data sheet EXB840, Fuji Electric Co., Ltd.), a negative voltage is generated by using a Zener voltage, and driving with a negative bias is realized by using the negative voltage thereby generated.

The circuit shown in FIG. 1 of patent literature 1 requires large-capacity by-pass capacitors (15 to 20) to stabilize a divided potential. However, lifetime may be shortened depending on the condition of use if aluminum electrolytic capacitors are used as the bypass capacitors.

The value of a resistor 33 should be reduced in order to shorten a charging time during a high-speed operation. However, reducing the value of the resistor 33 in turn increases a stand-by current that starts to flow concurrently with the turn-on of a power supply 1 supplied from a power transformer 1. This makes it difficult to reduce power consumption of the single power supply to be supplied.

Non-patent literature 1 suffers from the same problem. Non-patent literature 1 also suffers from the problem as follows. Provision of a capacitor is required in order to form a charge and discharge circuit of electric charges for the gate voltage of a switching element. In this case, a required capability of driving with a negative bias is substantially the same as that of the aforementioned bypass capacitors. This means a large-capacity capacitor should be provided, resulting in a fear of lifetime reduction.

SUMMARY OF THE INVENTION

The present invention is intended to provide a driving circuit of a simple structure for driving a switching element with a negative bias, and a semiconductor device with the driving circuit.

The driving circuit of the present invention is placed on an IC chip, and which drives a semiconductor switching element. The driving circuit includes a power supply circuit and a driving part. The power supply circuit receives a first voltage supplied from a single power supply provided outside the IC chip, generates a second voltage based on the first voltage, and applies the second voltage to a reference terminal of the semiconductor switching element. The driving part drives the semiconductor switching element by applying the first voltage or stopping application of the first voltage to a control terminal of the semiconductor switching element in response to an input signal given from outside the IC chip. The power supply circuit includes a buffer amplifier for sinking or sourcing a current for driving the control terminal of the semiconductor switching element.

The power supply circuit receives the first voltage supplied from the single power supply provided outside the IC chip, generates the second voltage based on the first voltage, and applies the second voltage to the reference terminal of the semiconductor switching element. The driving part drives the semiconductor switching element by applying the first voltage or stopping application of the first voltage to the control terminal of the semiconductor switching element in response to an input signal given from outside the IC chip. So, driving with positive and negative biases is allowed while provision of positive and negative power supplies is not required for the driving circuit. Further, not using an electrolytic capacitor does not cause a problem relating to a footprint or lifetime reduction of a capacitor if the power supply circuit is applied to a high-speed large-capacity semiconductor device. Also, the power supply circuit includes the buffer amplifier for sinking or sourcing a current for driving the control terminal of the semiconductor switching element. This eliminates the necessity to provide a large-capacity capacitor, so that lifetime reduction is prevented.

These and other objects, features, aspects and advantages of the present invention will become more apparent from the following detailed description of the present invention when taken in conjunction with the accompanying drawings.

EMBODIMENT FOR CARRYING OUT THE INVENTION

First Preferred Embodiment
Structure

Figure 1:
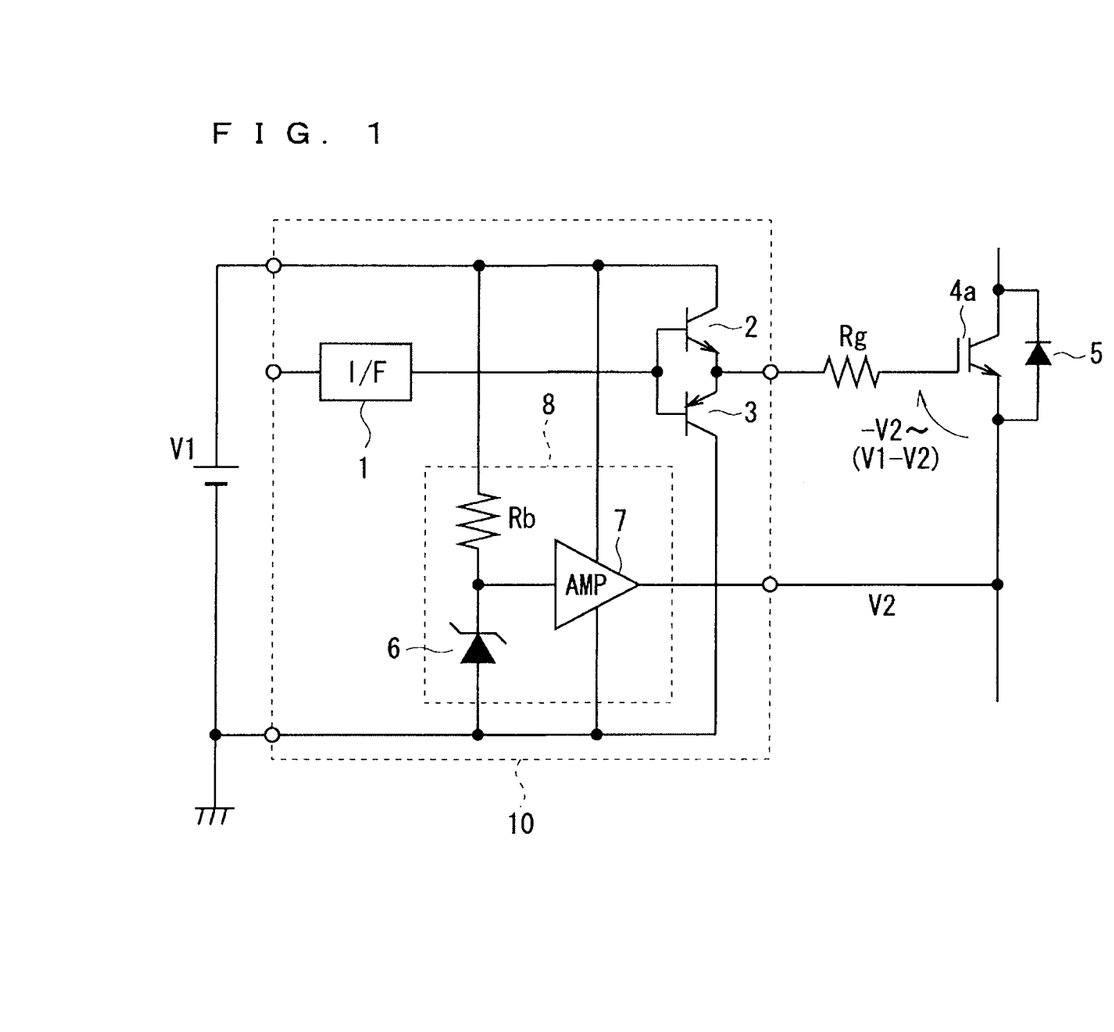
FIGS. 1 to 3 are circuit diagrams each showing a driving circuit of a first preferred embodiment.

FIG. 1 is a circuit diagram of a semiconductor device with a driving circuit of a first preferred embodiment for driving a semiconductor switching element. The semiconductor device of the preferred embodiment includes a switching element 4a that is an IGBT, for example. So, the semiconductor switching element 4a is shown as the IGBT 4a in FIG. 1. A recovery diode 5 is placed between the emitter and the collector of the IGBT 4a such that the emitter of the IGBT 4a and the anode of the recovery diode 5 are connected. The IGBT 4a has a gate terminal connected through a gate resistor Rg to a driving circuit 10.

The driving circuit 10 is formed in one chip as shown by dotted lines. Only a positive power supply (single power supply) V1 the reference potential of which is a ground potential (GND) is used as a power supply of the driving circuit 10. An I/F part 1 that receives a control signal from an external circuit has one end connected to the base terminals of bipolar transistors 2 and 3. The emitter terminals of the bipolar transistors 2 and 3 are connected to each other, and which are also connected to the gate terminal of the IGBT 4a to be driven.

The driving circuit 10 further includes a power supply circuit 8 for dividing a positive power supply V1. In the power supply circuit 8, a resistor Rb and a Zener diode 6 are placed between the anode and the cathode of the positive power supply V1. The power supply circuit 8 is connected to the emitter terminal of the IGBT 4a through a node between the resistor Rb and the Zener diode 6 and a buffer amplifier 7.
Operation The I/F part 1 receives a control signal from the external circuit to drive the gate of the IGBT 4a. The bipolar transistors 2 and 3 are NPN and PNP bipolar transistors respectively. Either the bipolar transistor 2 or 3 is driven in response to an input current applied from the I/F part 1. In order to turn the IGBT 4a on, the bipolar transistor 2 is driven, so that the positive power supply V1 is applied through the gate resistor Rg to the gate terminal of the IGBT 4a. At this time, as shown by a path indicated by an arrow Ig (ON) in FIG. 2, an ON current Ig (ON) for driving the gate terminal passes through the bipolar transistor 2, the gate resistor Rb, the IGBT 4a, the buffer amplifier 7, and the power supply V1.

Figure 2:
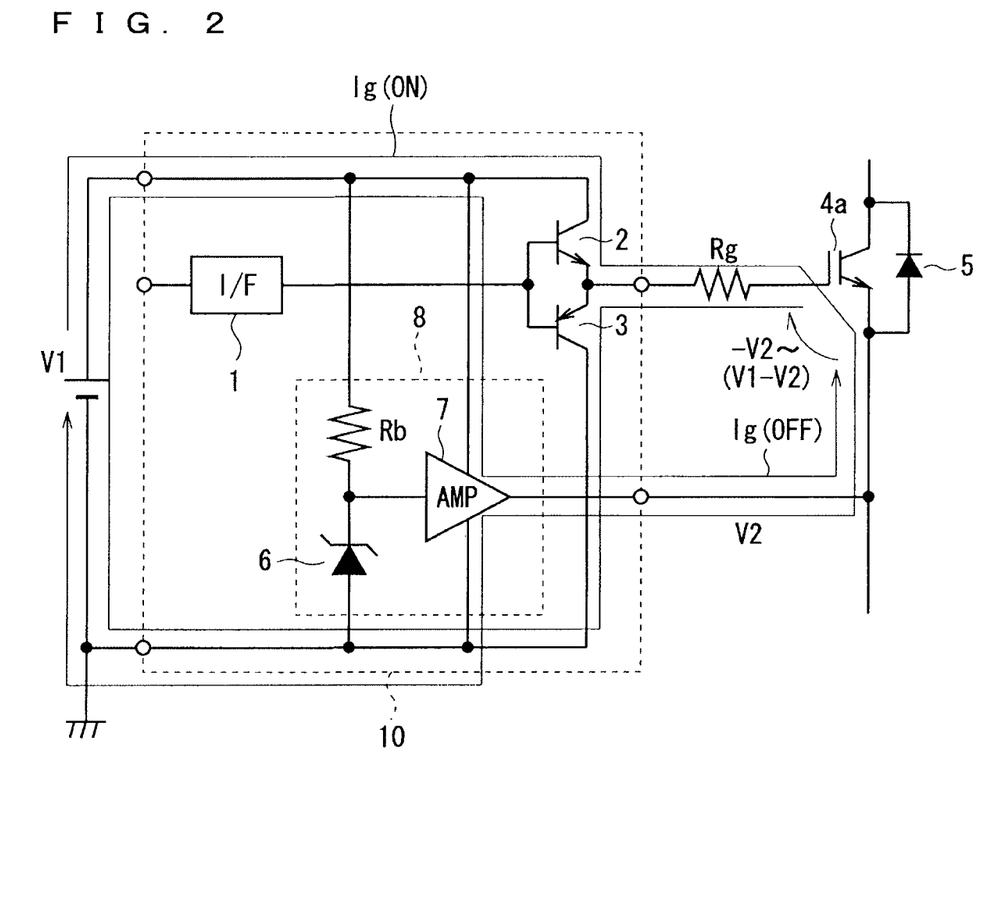
Figure 3:
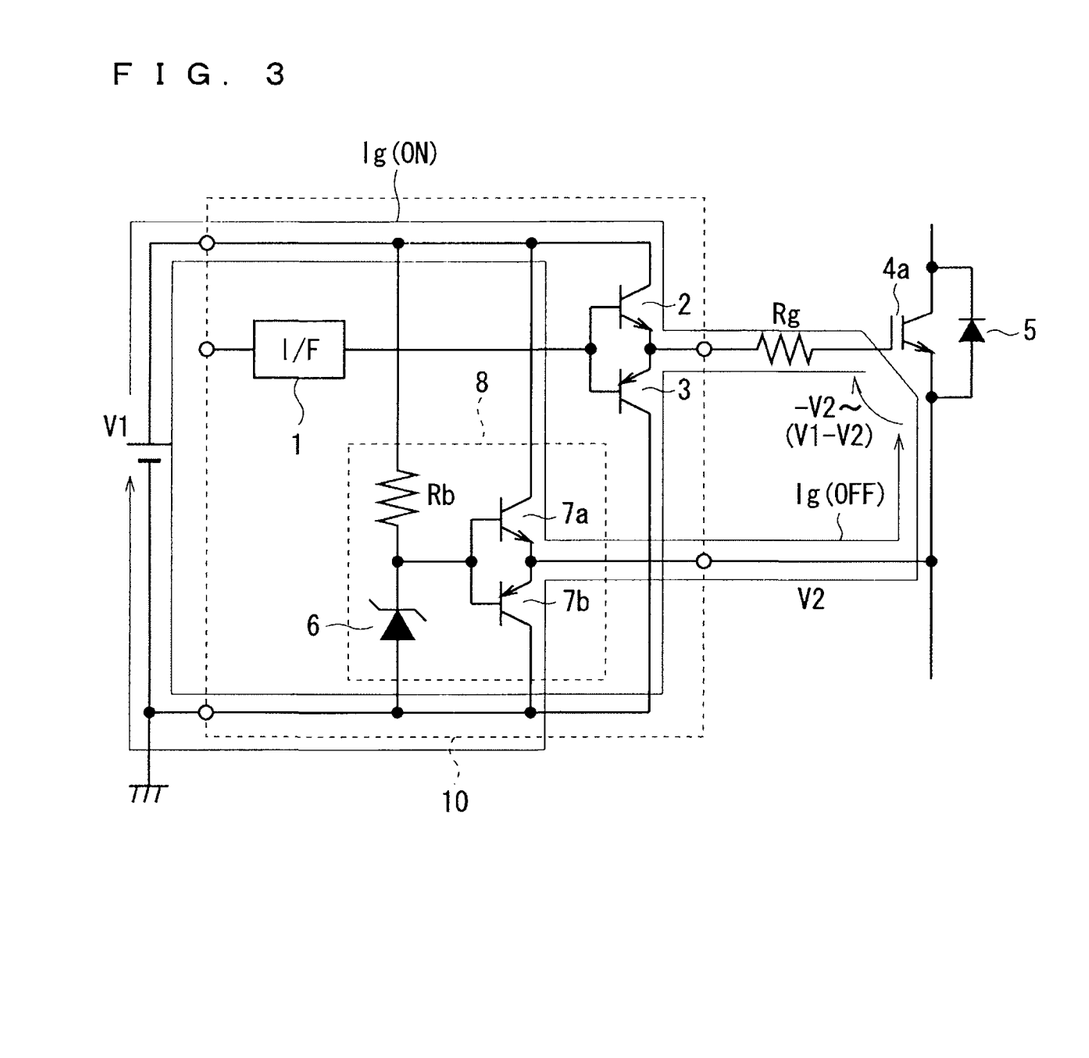

An OFF current Ig (OFF) for turning the IGBT 4a off is also shown by a path indicated by an arrow Ig (OFF) in FIG. 2. According to this path, a gate current is absorbed by the bipolar transistor 3, the power supply V1, and the buffer amplifier 7 to block a gate voltage.

So, the I/F part 1, and the bipolar transistors 2 and 3 function as a driving part to drive the semiconductor switching element 4a.

As an example, the structure of the buffer amplifier 7 is such that it includes PNP and NPN bipolar transistors with common base terminals, and that the emitter terminals of the PNP and NPN bipolar transistors are connected to each other.

The power supply circuit 8 generates a second voltage V2 based on a first voltage V1 supplied from the positive power supply V1, and supplies the second voltage V2 to the emitter terminal of the IGBT 4a. The Zener diode 6 has a Zener voltage that is V2 (V2<V1), so a voltage drop (V1–V2) is generated across the resistor Rb. The Zener voltage V2 is applied through the buffer amplifier 7 to the emitter terminal of the IGBT 4a.

As described above, the voltage V1 is applied to the gate terminal of the IGBT 4a while the voltage V2 is applied as a negative bias to the emitter terminal of the IGBT 4a when the IGBT 4a is turned on. So, a voltage (V1–V2) is developed as the gate-to-emitter voltage during turn-on, and a voltage (–V2) is developed as the gate-to-emitter voltage during turn-off. This simple structure allows a switching element to be driven with a negative bias by using a single power supply.

The power supply circuit 8 of the first preferred embodiment generates the reference voltage V2 for a negative bias. The power supply circuit 8 of the first preferred embodiment also has a capability to drive a gate that is required when the buffer amplifier 7 turns a switching element on and off. This eliminates the necessity to provide a large-capacity capacitor in a path through which electric charges are accumulated in or discharged from the gate of the IGBT 4a. So, the power supply circuit 8 does not cause a problem relating to a footprint or lifetime reduction of a capacitor even if it is applied a to high-speed large-capacity semiconductor device.

Further, a bias current determined by the resistor Rb for generating a reference voltage is suppressed low, thereby realizing power consumption reduction.
Effects The driving circuit of the first preferred embodiment is the driving circuit 10 placed on an IC chip and which drives the semiconductor switching element 4a. The driving circuit 10 includes the power supply circuit 8 and the driving part. The power supply circuit 8 receives the first voltage V1 supplied from a single power supply provided outside the IC chip, generates the second voltage V2 based on the first voltage V1, and applies the second voltage V2 to a reference terminal of the semiconductor switching element 4a. The driving part drives the semiconductor switching element 4a by applying the first voltage V1 or stopping application of the first voltage V1 to a control terminal of the semiconductor switching element 4a in response to an input signal given from outside the IC chip. So, driving with positive and negative biases is allowed while provision of positive and negative power supplies is not required for the driving circuit. Further, not using an electrolytic capacitor does not cause a problem relating to a footprint or lifetime reduction of a capacitor even if the power supply circuit 8 is applied to a high-speed large-capacity semiconductor device. Also, the power supply circuit 8 includes the buffer amplifier 7 for sinking or sourcing a current for driving the control terminal of the semiconductor switching element 4a. This eliminates the necessity to provide a large-capacity capacitor, so that lifetime reduction is prevented.

Second Preferred Embodiment

Structure

Figure 4:
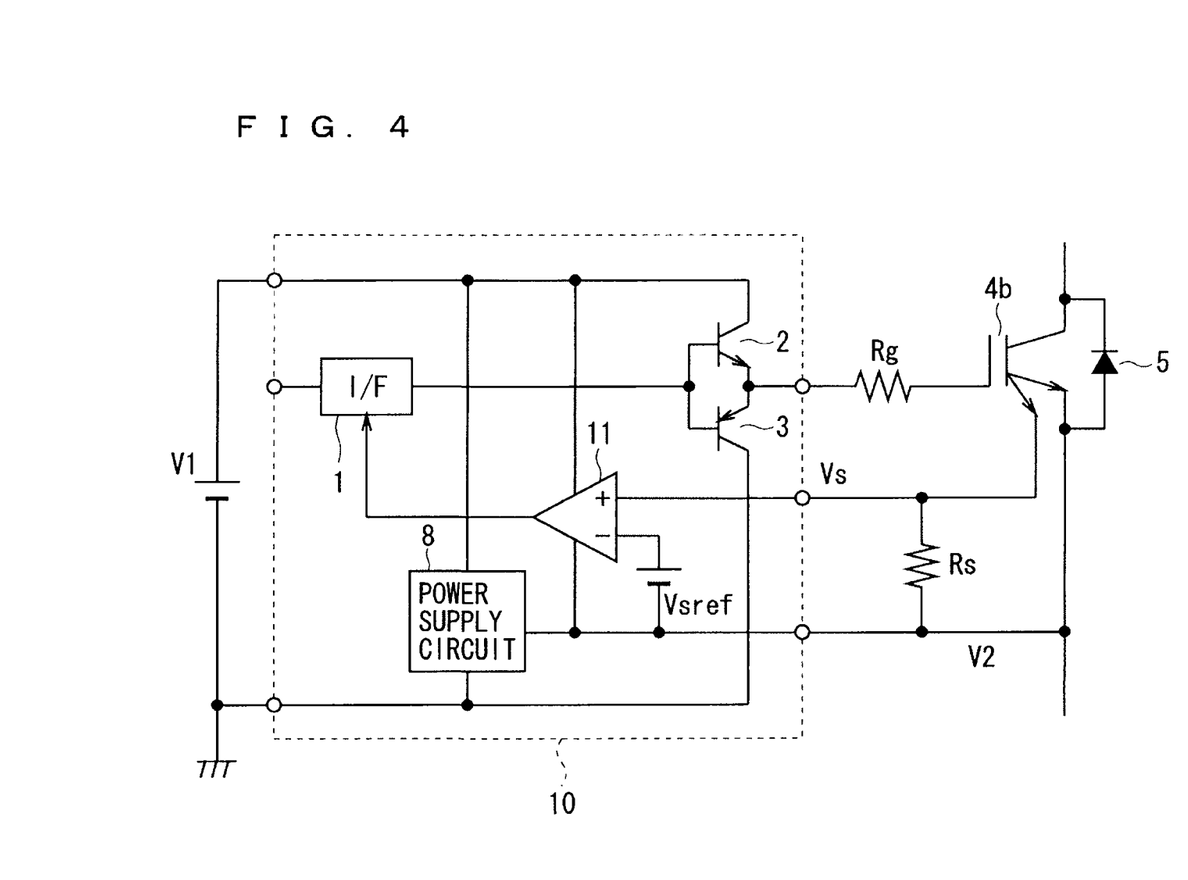
FIG. 4 is a circuit diagram showing a driving circuit of a second preferred embodiment.

FIG. 4 is a circuit diagram of a semiconductor device with a driving circuit of a second preferred embodiment for driving a semiconductor switching element. The semiconductor device of the second preferred embodiment includes a switching element 4b that is an IGBT with a sense terminal. A sense resistor Rs at which a voltage drop caused by a sense current is generated is placed between the emitter terminal and the sense terminal.

A driving circuit 10 of the second preferred embodiment includes a comparator 11 for detecting a main current in addition to the structure of the first preferred embodiment. The positive-phase input of the comparator 11 is connected to the sense terminal of the IGBT 4b. The comparator 11 compares a voltage drop Vs generated at the sense resistor Rs with a threshold Vsref to determine if the main current flows excessively. The structure of the second preferred embodiment is the same in other respects as that of the first preferred embodiment, and is not described repeatedly.

Operation

A sense current the ratio of which to the collector-to-emitter current (main current) is arbitrarily determined flows in the sense terminal. The sense current generates a detecting voltage Vs across the sense resistor Rs. The comparator 11 compares the detecting voltage Vs and a threshold voltage Vsref. If determining that the detecting voltage Vs is greater than the threshold voltage Vsref, the comparator 11 gives a signal "H" to an I/F part 1. Then, the I/F part 1 determines that the main current has flown excessively, and blocks an output to drive a gate.

To be specific, the comparator 11 and the I/F part 1 function as an overcurrent detecting circuit that stops application of a voltage to the gate terminal of the semiconductor switching element 4b if the sense current exceeds a certain threshold. Provision of the overcurrent detecting circuit makes it possible to turn the semiconductor switching element 4b off safely.

In FIG. 4, the reference potential of the threshold voltage Vsref is made the same as that of the emitter of the IGBT 4b. This makes the reference potentials of the detecting voltage Vs and the threshold voltage Vsref to be the same. So, the change of a negative bias potential V2 will not exert any influence even if it occurs, thereby making it possible to set the detecting voltage Vs low. As a result, the split ratio between the main current and the sense current of the IGBT 4b is stabilized to further enhance detection accuracy.

First Modification

Figure 5:
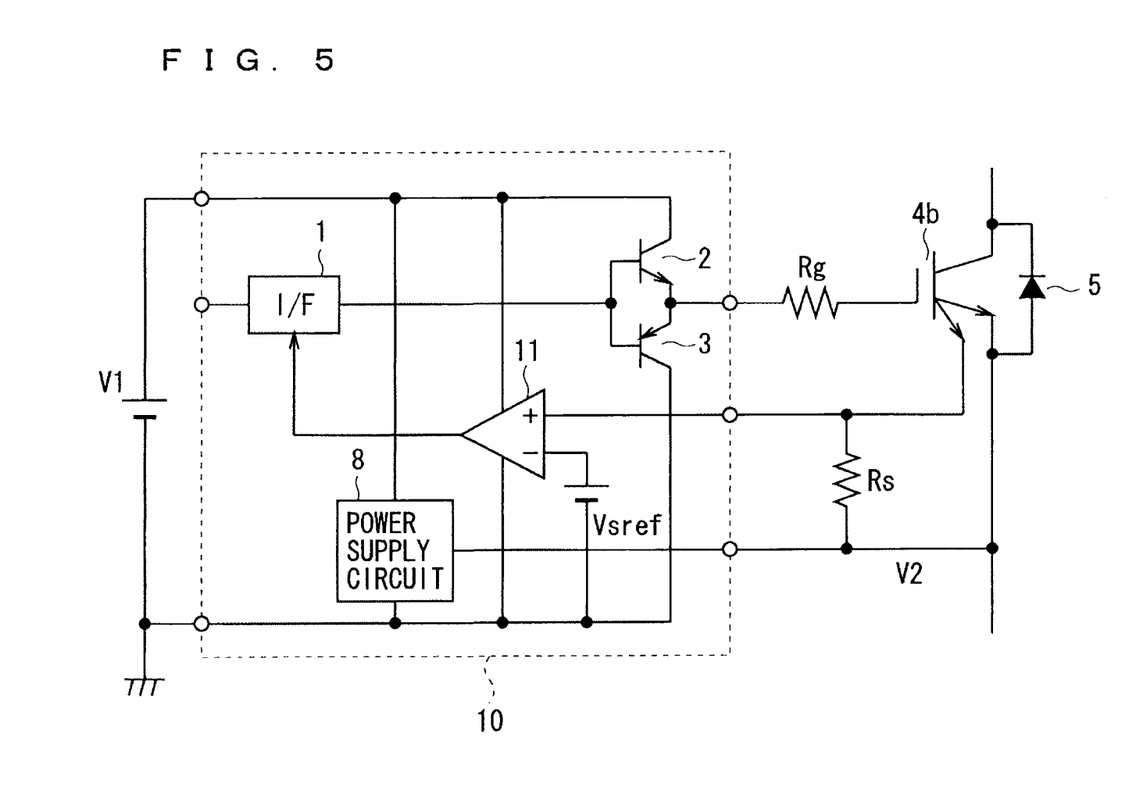
FIGS. 5 and 6 are circuit diagrams each showing a driving circuit of a modification of the second preferred embodiment.

FIG. 5 is a circuit diagram of a semiconductor device of a first modification of the second preferred embodiment. The circuit configuration shown in FIG. 5 differs from that shown in FIG. 4 in that the reference potential of the threshold voltage Vsref is set at a potential GND that is also the reference potential of the input power supply V1.

It is desirable that the detecting voltage Vs be suppressed low in order to stabilize the split ratio between the main current and the sense current of the IGBT 4b. So, the threshold voltage Vsref is also generally set at a low level such as 0.5 V. However, this in turn reduces a margin for malfunction caused by noise. In response, the reference potential of the threshold voltage Vsref is set at the potential GND as shown in FIG. 5. In this case, the potential V2 generated for a negative bias and the detecting voltage Vs are added, and the resultant is compared with the threshold voltage Vsref. So, the threshold voltage Vsref is increased while the detecting voltage Vs is suppressed low and the split between the main current and the sense current is stabilized, thereby increasing a margin for malfunction caused by noise.

Second Modification

Figure 6:
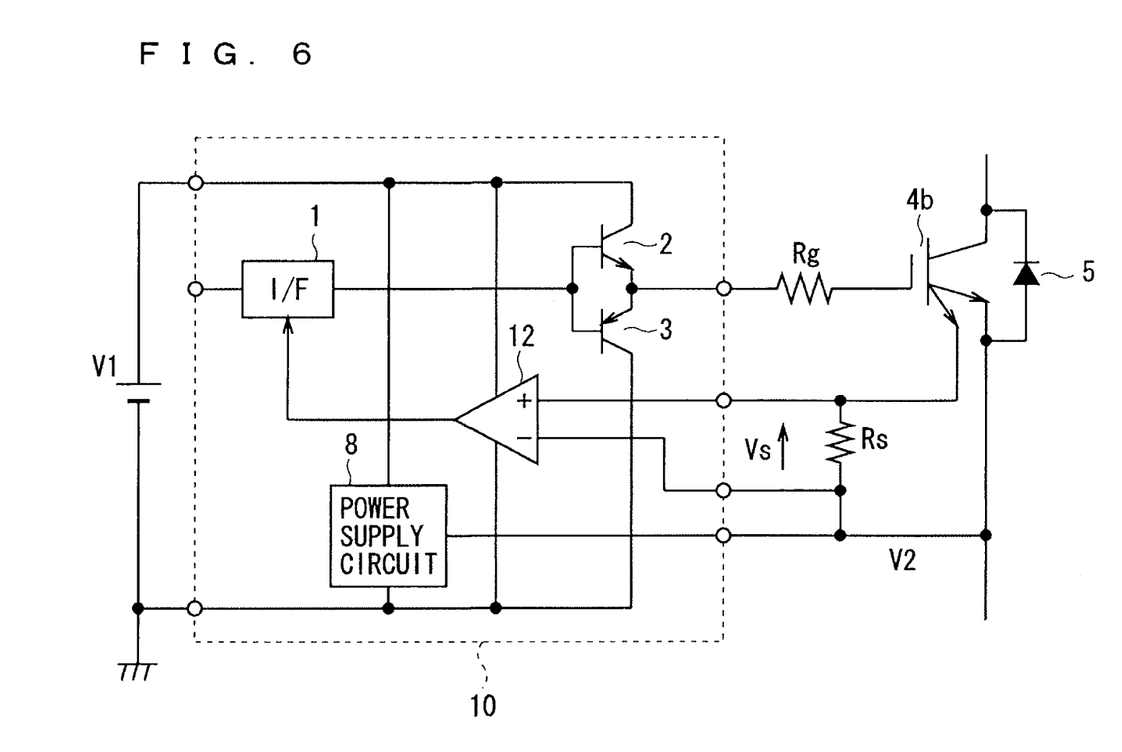

FIG. 6 is a circuit diagram of a semiconductor device of a second modification of the second preferred embodiment. In the circuit configuration shown in FIG. 6, a differential amplifier 12 takes the place of the comparator 11 shown in FIG. 4 to detect overcurrent.

The positive-phase and negative-phase inputs of the differential amplifier 12 are connected to the opposite ends of the sense resistor Rs. The differential amplifier 12 measures the detecting voltage Vs, and outputs the measured detecting voltage Vs to the I/F part 1. The I/F part 1 determines that the main current has flown excessively if the detecting voltage Vs exceeds a certain threshold, and stops driving of a gate.

This structure is free from the influence of the change of the negative bias potential V2, thereby enhancing accuracy. So, the detecting voltage Vs is set low to stabilize the split ratio between the main current and the sense current, thereby further enhancing detecting accuracy.

Third Modification

Figure 7:
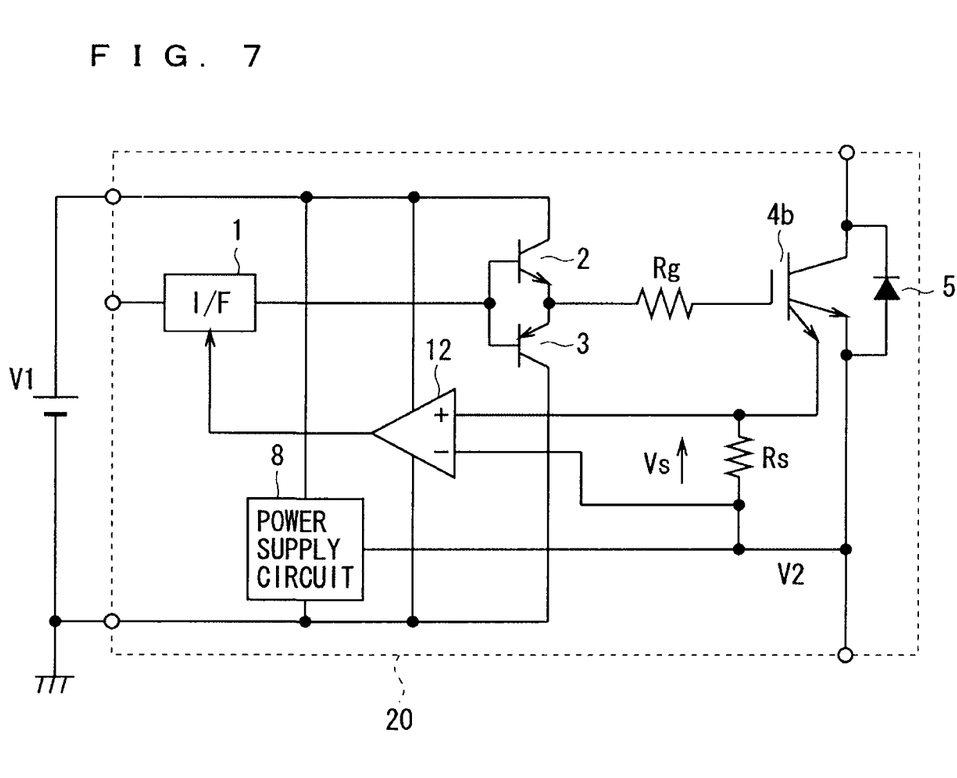
FIGS. 7 and 8 are circuit diagrams each showing a semiconductor device of a modification of the second preferred embodiment.

The driving circuit 10 for driving the switching element 4a or 4b is placed on one chip in FIGS. 1 to 4. Meanwhile, the driving circuit 10 and a semiconductor switching element driven by the driving circuit 10 may be placed together on one IC chip to form an IPM. FIG. 7 shows a circuit configuration in which an IPM is formed in the second modification.

Figure 8:
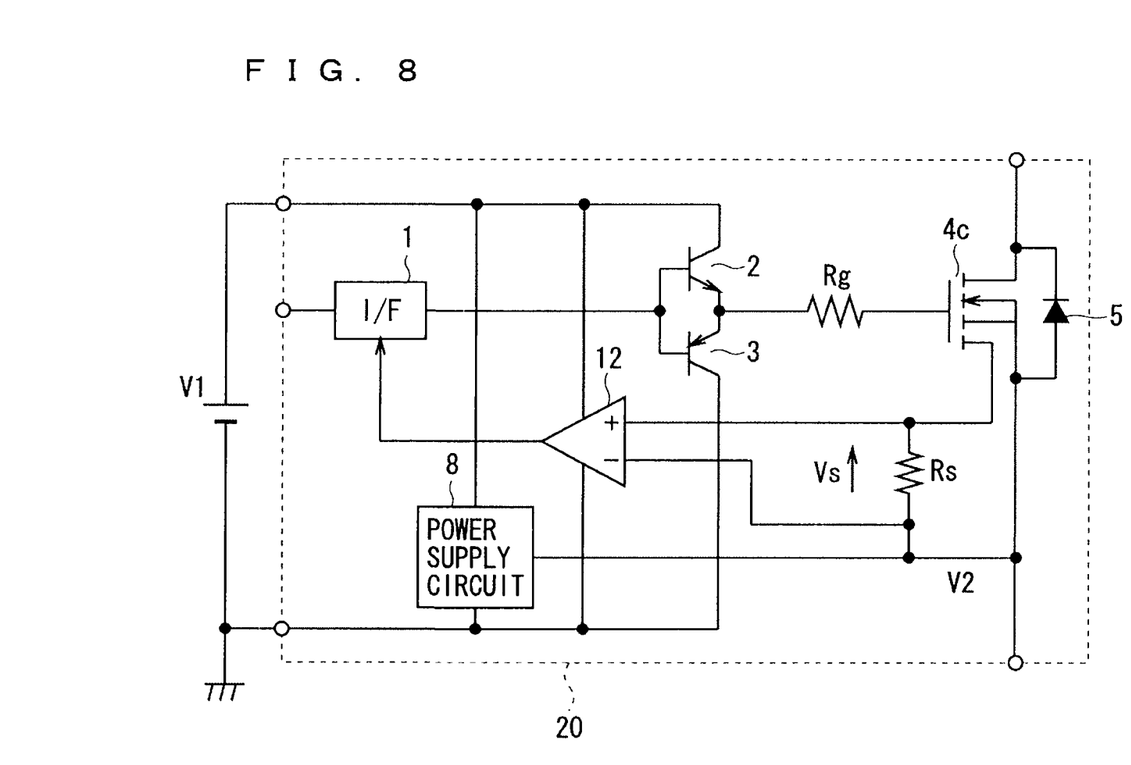

An IGBT is used as the semiconductor switching element 4a or 4b in FIGS. 1 to 5. Meanwhile, an MOSFET may take the place of an IGBT as shown in FIG. 8. Further, wide-gap semiconductor such as SiC and GaN as well as Si may be used as a material of the semiconductor switching element 4a or 4b. An SiC MOSFET that is widely put into practical use has a low threshold voltage of 2.5 V, so it may be turned on accidentally due to increase of a voltage change dv/dt caused by high-speed switching of the element, or due to extraneous noise. Meanwhile, an MOSFET as a unipolar device allows a high-frequency operation. So, driving with a negative bias by the driving circuit of the present invention is effectively applicable to shorten a switching time by the high-frequency operation.

Effects

In the driving circuit of the second preferred embodiment, the semiconductor switching element 4b has a sense terminal in which a sense current the ratio of which to a main current is arbitrarily determined flows. The driving circuit of the second preferred embodiment also includes an overcurrent detecting circuit that stops application of a voltage to a control terminal of the semiconductor switching element 4b if the sense current exceeds a certain threshold. This makes it possible to turn the semiconductor switching element 4b off safely if overcurrent is detected.

The driving circuit of the second preferred embodiment also includes the sense resistor Rs at which a voltage drop caused by the sense current is generated is placed between the sense terminal and a reference terminal. The overcurrent detecting circuit includes the comparator 11 the reference potential of which is the same as that of the semiconductor switching element, and which has a positive-phase input connected to the sense terminal. So, detection accuracy is enhanced as the change of the negative bias potential V2 will not exert any influence, thereby making it possible to set the detecting voltage Vs low. As a result, the split ratio between the main current and the sense current of the IGBT 4b is stabilized to further enhance detection accuracy.

Or, the driving circuit of the second preferred embodiment also includes the sense resistor Rs at which a voltage drop caused by the sense current is generated is placed between the sense terminal and the reference terminal of the semiconductor switching element 4b. The overcurrent detecting circuit includes the comparator 11 the reference potential of which is the same as that of the single power supply V1, and which has a positive-phase input connected to the sense terminal. So, the threshold voltage Vsref is increased while the detecting voltage Vs is suppressed low and the split between the main current and the sense current is stabilized, thereby increasing a margin for malfunction caused by noise.

The driving circuit of the second preferred embodiment also includes the sense resistor Rs at which a voltage drop caused by the sense current is generated is placed between the sense terminal and the reference terminal. The overcurrent detecting circuit includes the differential amplifier 12 having input terminals connected to the opposite ends of the sense resistor Rs. So, the change of the negative bias potential V2 will not exert any influence to enhance detection accuracy, thereby making it possible to set the detecting voltage Vs low. As a result, the split ratio between the main current and the sense current of the IGBT 4b is stabilized to further enhance detection accuracy.

The semiconductor device of the first or second preferred embodiment includes an IC chip on which the driving circuit 10 of the present invention is placed, and the semiconductor switching element 4a or 4b driven by the driving circuit 10 is also placed on the IC chip. This simple structure allows the switching element to be driven with a negative bias.

The semiconductor switching element 4a, 4b or 4c is made of wide-gap semiconductor, so it may be turned on accidentally due to increase of a voltage change dv/dt caused by high-speed switching of the element, or due to extraneous noise. Meanwhile, driving with a negative bias by the driving circuit 10 of the present invention prevents such accidental turn-on.

While the invention has been shown and described in detail, the foregoing description is in all aspects illustrative and not restrictive. It is therefore understood that numerous modifications and variations can be devised without departing from the scope of the invention.

REFERENCE SIGNS LIST

1: I/F part
2, 3: Bipolar transistor
4a, 4b, 4c: Semiconductor switching element
5: Recovery diode
6: Zener diode
7: Buffer amplifier
8: Power supply circuit
20: Driving circuit
11: Comparator
12: Differential amplifier
20: IPM
V1: Input power supply

What is claimed is:

1. A driving circuit placed on an IC chip, and which drives a semiconductor switching element, the driving circuit comprising:

a power supply circuit for receiving a first voltage supplied from a single power supply provided outside said IC chip, generating a second voltage based on said first voltage, and applying said second voltage to a reference terminal of said semiconductor switching element; and a driving part for driving said semiconductor switching element by applying said first voltage or stopping application of said first voltage to a control terminal of said semiconductor switching element in response to an input signal given from outside said IC chip, wherein the power supply circuit includes a buffer amplifier for sinking or sourcing a current for driving said control terminal of said semiconductor switching element.

2. The driving circuit according to claim 1, wherein said semiconductor switching element has a sense terminal in which a sense current the ratio of which to a main current is arbitrarily determined flows, the driving circuit further comprising an overcurrent detecting circuit that stops application of a voltage to said control terminal of said semiconductor switching element if said sense current exceeds a certain threshold.

3. The driving circuit according to claim 2, further comprising a sense resistor at which a voltage drop caused by said sense current is generated is placed between said sense terminal and said reference terminal, wherein said overcurrent detecting circuit includes a comparator the reference potential of which is the same as that of said semiconductor switching element, and which has a positive-phase input connected to said sense terminal.

4. The driving circuit according to claim 2, further comprising a sense resistor at which a voltage drop caused by said sense current is generated is placed between said sense terminal and said reference terminal, wherein said overcurrent detecting circuit includes a comparator the reference potential of which is the same as that of said single power supply, and which has a positive-phase input connected to said sense terminal.

5. The driving circuit according to claim 2, further comprising a sense resistor at which a voltage drop caused by said sense current is generated is placed between said sense terminal and said reference terminal, wherein said overcurrent detecting circuit includes a differential amplifier having input terminals connected to the opposite ends of said sense resistor.

6. A semiconductor device with an IC chip on which the driving circuit as recited in claim 2 is placed, wherein said semiconductor switching element driven by said driving circuit is also placed on said IC chip.

7. The semiconductor device according to claim 6, wherein said semiconductor switching element is made of wide-gap semiconductor.

8. A semiconductor device with an IC chip on which the driving circuit as recited in claim 1 is placed, wherein said semiconductor switching element driven by said driving circuit is also placed on said IC chip.

9. The semiconductor device according to claim 8, wherein said semiconductor switching element is made of wide-gap semiconductor.

* * * * *